(No Model.)  3 Sheets—Sheet 1.
T. F. MORRIN.
AUTOMATIC FEED WATER REGULATOR AND ALARM.
No. 548,783. Patented Oct. 29, 1895.
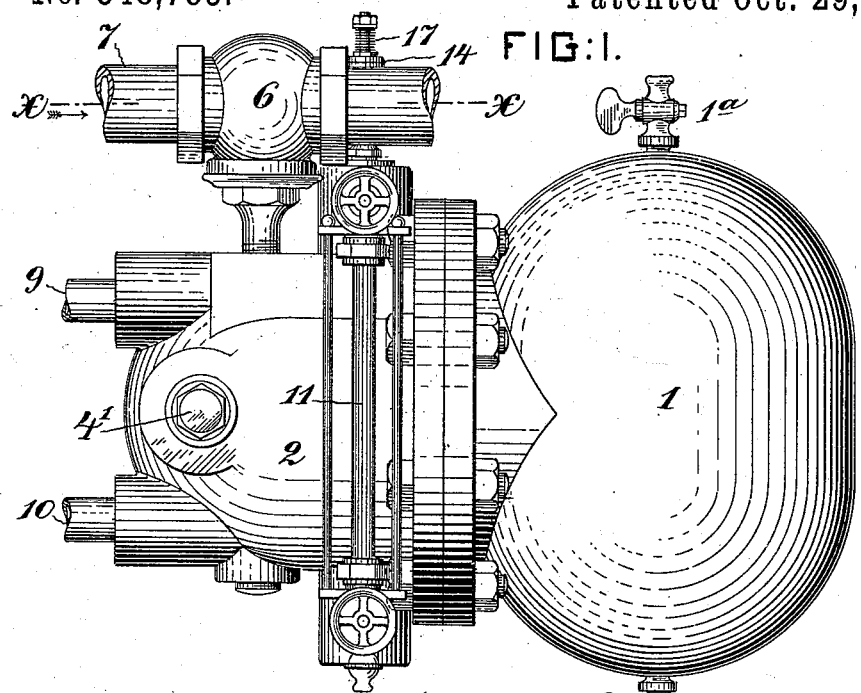
FIG: 1.
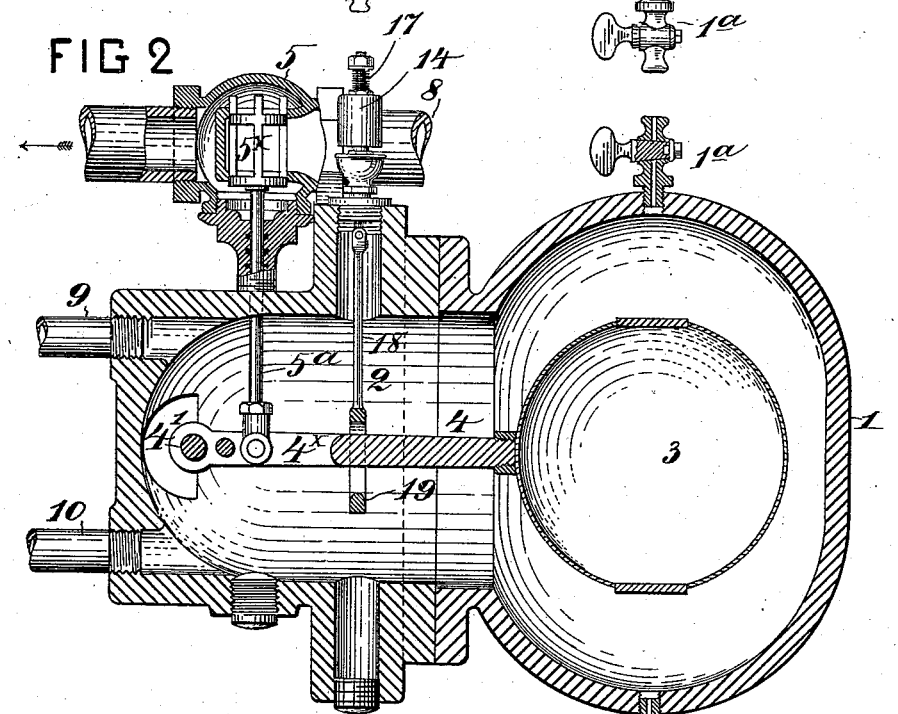
FIG 2.
Witnesses:
Inventor:
Thomas F. Morrin
by Henry Connett
his Attorney (No Model.) 3 Sheets—Sheet 2.
T. F. MORRIN.
AUTOMATIC FEED WATER REGULATOR AND ALARM.
No. 548,783. Patented Oct. 29, 1895.
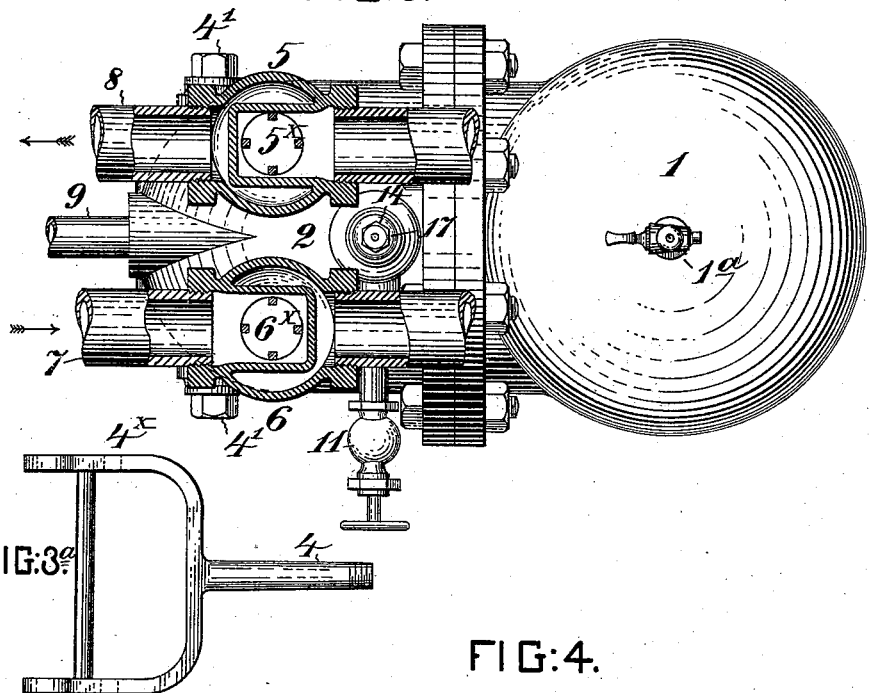
FIG:3.
FIG:3.ª
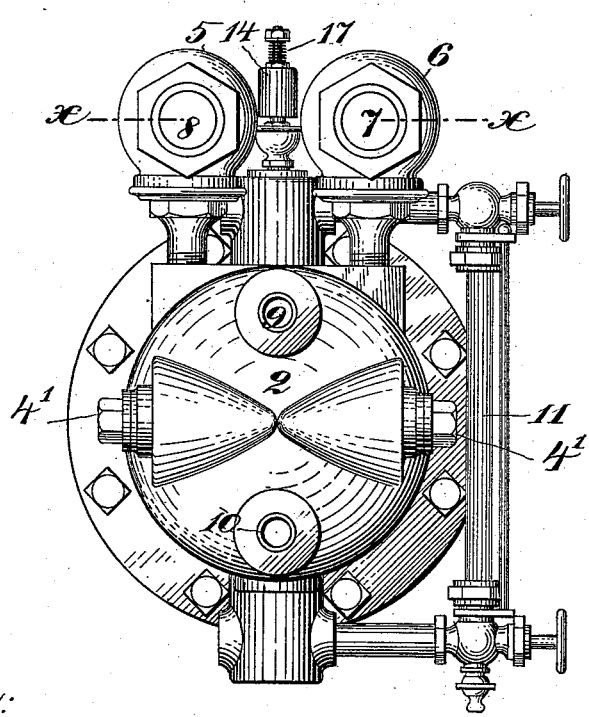
FIG:4.
Witnesses:
Inventor:

(No Model.) 3 Sheets—Sheet 3.
T. F. MORRIN.
AUTOMATIC FEED WATER REGULATOR AND ALARM.
No. 548,783. Patented Oct. 29, 1895.
FIG: 5.
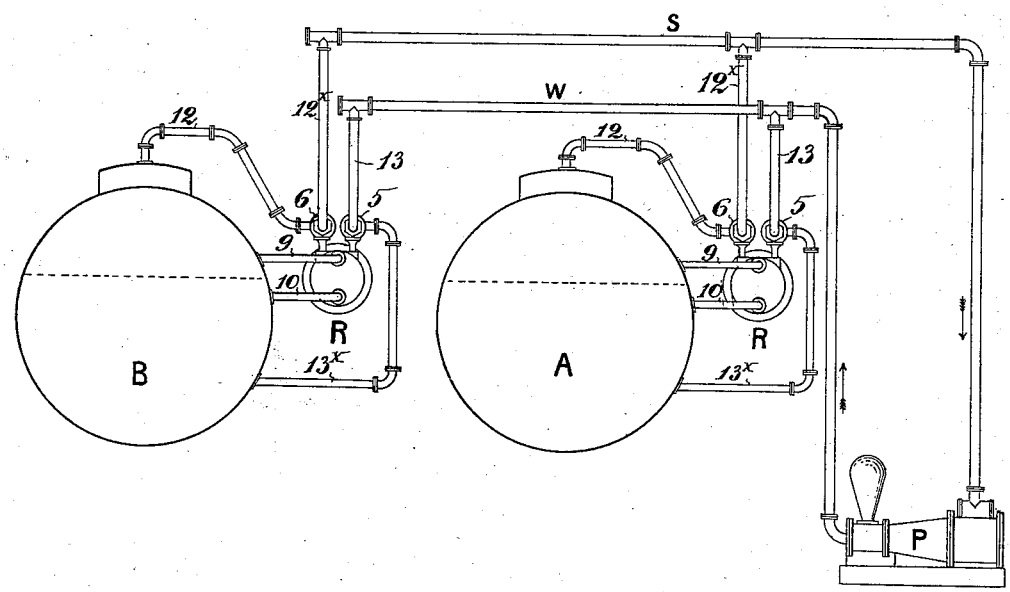
FIG: 6.
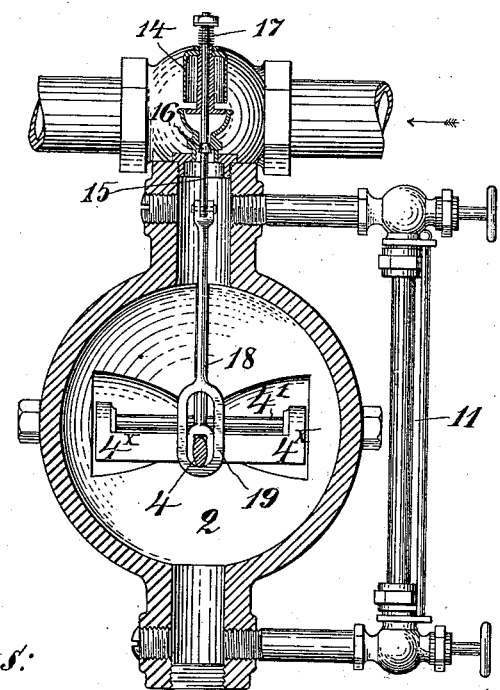
FIG: 7.
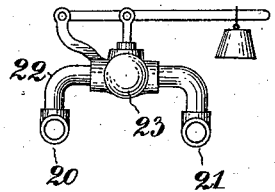
Witnesses:
J. W. Wiman
Peter A. Ross
Inventor:
Thomas F. Morrin
by Henry Connett
his Attorney

UNITED STATES PATENT OFFICE.

THOMAS F. MORRIN, OF JERSEY CITY, NEW JERSEY.

AUTOMATIC FEED-WATER REGULATOR AND ALARM.

SPECIFICATION forming part of Letters Patent No. 548,783, dated October 29, 1895.

Application filed April 27, 1894. Serial No. 509,236. (No model.)

*To all whom it may concern:*

Be it known that I, THOMAS F. MORRIN, a citizen of the United States, residing at Jersey City, Hudson county, New Jersey, have invented certain new and useful Improvements in Automatic Feed-Water Regulators and Alarms, of which the following is a specification.

My invention relates to the class of devices whereby the feed or water supply of a steam-generator is regulated and controlled by a float, and the object is to provide a simple and efficient regulating device which is adapted for a single generator or for a battery of generators or boilers, and which may also be adapted to sound an alarm in case the water should from any cause fall below a certain predetermined level.

The invention will be fully described hereinafter, and its novel features carefully described in the claim.

In the accompanying drawings, which serve to illustrate an embodiment of the invention, Figure 1 is a side elevation of the device detached and drawn to a comparatively-large scale. Fig 2 is a vertical mid-section of the device showing, also, the casing of one of the balanced valves in section. Fig. 3 is a horizontal section or sectional plan of the device, the plane of the section being taken through the balanced valves in the plane of line $x\ x$ in Figs. 1 and 4. Fig. 3ª shows the rocking arm of the float detached and in plan. Fig. 4 is an end elevation of the device, that end at the left in Fig. 1 being shown. Fig. 5 is a somewhat diagrammatic view showing the application of the device to a battery of steam-boilers. This view is on a small scale. Fig. 6 is a transverse vertical section of the device in the plane of the alarm-whistle. Fig. 7 is a detached view showing the by-pipe and valve.

The function of the device herein illustrated is, in part, to regulate the supply of feed-water to a steam-generator, and this it effects through the instrumentality of a balanced valve in the pipe which leads steam to the feed-pump and in the pipe which leads water from the eduction side of the feed-pump to the generator and a float which closes and opens said valves. In addition to this the function of the device is, in part, to sound an alarm when the float falls below a certain predetermined level, in order to warn the engineer or attendant that for some reason the water in the generator is getting too low for safety. The devices I employ for effecting these objects will now be described.

Referring, primarily, to Figs. 1 to 4, inclusive, 1 represents the float-chamber, and 2 the chamber in which plays the stem of the float. These chambers may be of cast-iron and they have faced flanges, whereby they are screwed or bolted together, as clearly shown. The float 3 has a stem 4. (Seen detached in plan in Fig. 3ª.) I provide this stem with forks or branches $4^{\times}$ to furnish a broad pivotal bearing for the stem on a transverse rod $4^1$, mounted at its ends in the wall of the chamber 2. On the chamber 2 are mounted the casings or chambers 5 and 6 of two balanced valves $5^{\times}$ and $6^{\times}$, coupled by pendent stems to the respective branches $4^{\times}$ of the stem 4. In Fig. 2 the stem $5^a$ of the valve $5^{\times}$ is represented, and as both valve-stems are constructed and arranged in the same manner this illustration will serve for both. The valve $6^{\times}$ controls the flow of steam from the boiler to the steam-pump through a pipe 7 and the valve $5^{\times}$ controls the flow of water from the pump to the generator through a pipe 8. The chambers 1 and 2 are put in communication with the generator by means of pipes 9 and 10, the former entering the generator above the normal water-level and the latter entering it below said level. An ordinary water-gage 11 may be mounted on the apparatus, as clearly indicated in Figs. 1 and 4.

Fig. 5 illustrates the application of the device to a battery of boilers or generators. Two boilers A B are shown, but there may be more than two. P is the feed-pump, and R R represent the two feed-regulating apparatuses as a whole. S is the main steam-pipe for supplying the pump, and W is the main feed-water pipe, through which the pump supplies the boilers. The connections are alike for both boilers. A pipe 12 leads steam from the dome of the boiler to the valve-chamber 6, and the steam flows thence by a pipe $12^{\times}$ to the pipe S, and a pipe 13 leads water from the pipe W to the valve-chamber 5, and the water flows thence by a pipe $13^{\times}$ to the boiler below the normal water-level.

The operation is as follows: When the water rises in the generator, it lifts the float 3, and when the water reaches the normal level the float will have so lifted the valves 5<sup>×</sup> and 6<sup>×</sup> that they will cut off the supply of steam to the feed-pump P and also the water-supply from the pump to the generator, and as the several boilers in the battery may generate steam unequally from unequal firing or from other causes the supply of water to one boiler may be cut off without in any way affecting the others or any other. Thus the regulator is adapted to one generator or to several generators arranged in a battery and employing a single feed-pump.

Should the feeding mechanism get out of order or the water get too low in the generators or in any one of them, an alarm will be sounded. This alarm mechanism will be best understood by reference to Fig. 6.

An ordinary steam-whistle 14 is mounted on the shell of the chamber 2, and passing down through the whistle is a valve-stem 15, on which is a valve 16, which controls the admission of steam to the whistle from the chamber 2. The stem is held up to its seat by a spring 17 at the upper end of the stem. To the stem 15 is coupled a rod 18, which has in it an elongated yoke 19, which embraces the stem 4 of the float 3. When the float falls below a predetermined level, its stem strikes or engages the lower end of the yoke 19 and draws down the valve-stem 15, thus admitting steam to the whistle and sounding the alarm; or in case of a battery of boilers only one balanced valve may be employed, arranged in the feed-water pipe of each regulating apparatus R. In such a case there would be a by-pipe between the induction and eduction pipes of the pump and a safety-valve in such pipe controlled by a weight, so that in case the valves at the regulators R were all closed the water might circulate at the pump until the pump could be stopped by hand. Such a by-pipe is illustrated in Fig. 7, wherein 20 represents the induction-pipe of a feed-pump, 21 the eduction-pipe thereof, 22 the by-pipe connecting the two pipes 20 and 21, and 23 a safety-valve in said pipe. If the eduction or supply pipe be closed between the generator and the pump before the pressure can rise to a dangerous point, the safety-valve will rise and allow the water to flow to the eduction side of the pump.

Respecting the valves which control the flow of steam and water through the pipes 7 and 8, I would say that these should be balanced or equilibrium valves; but it is not absolutely essential that they should be of the kind herein shown. The valve shown is of trundle form— that is, it comprises two like disks connected by staves or ties. The fluid enters the inner casing between the disks, and thus preserves equilibrium. When the disks move down—as the valves are here shown—the fluid passes around the disks into the outer casing of the valve.

To get at the float 3 the part of the casing containing the float-chamber is removed from that containing the chamber 2. The cocks 1<sup>a</sup> on the chamber 1 allow of blowing off when required.

Having thus described my invention, I claim—

The combination with a steam-generator, a feed-pump, a water-pipe extending from the pump to the generator, and a steam-pipe extending from the generator to the pump, of a feed-water regulator, comprising a casing having inlets which communicate with the interior of the generator above and below the water-level therein, a forked float-stem pivoted in said casing, a float on said stem, valves in the water and steam-pipes, and valve-stems for said valves, extending through the wall of said float-casing and connected with the respective branches of the forked float-stem, substantially as set forth.

In witness whereof I have hereunto signed my name in the presence of two subscribing witnesses.

THOMAS F. MORRIN.

Witnesses:
HENRY CONNETT,
PETER A. ROSS.